US009557864B2

United States Patent
Wang et al.

(10) Patent No.: US 9,557,864 B2
(45) Date of Patent: *Jan. 31, 2017

(54) INTEGRATED LCD TOUCH SCREEN TO DETERMINE A TOUCH POSITION BASED ON AN INDUCED VOLTAGE SUPERIMPOSED ON BOTH THE SCAN SIGNAL OF THE GATE LINE AND A TIMING PULSE OF THE SIGNAL LINE

(71) Applicants: BOE TECHNOLOGY GROUP CO., LTD., Beijing (CN); BEIJING BOE OPTOELECTRONICS TECHNOLOGY CO., LTD., Bejing (CN)

(72) Inventors: Zheng Wang, Beijing (CN); Jai-Il Ryu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 209 days.

This patent is subject to a terminal disclaimer.

(21) Appl. No.: 14/263,107

(22) Filed: Apr. 28, 2014

(65) Prior Publication Data
US 2014/0232685 A1 Aug. 21, 2014

Related U.S. Application Data

(62) Division of application No. 12/546,843, filed on Aug. 25, 2009, now Pat. No. 8,749,511.

(30) Foreign Application Priority Data

Sep. 5, 2008 (CN) .......................... 2008 1 0119724

(51) Int. Cl.
G06F 3/044 (2006.01)
G06F 3/041 (2006.01)
G02F 1/1333 (2006.01)

(52) U.S. Cl.
CPC ............ G06F 3/044 (2013.01); G02F 1/13338 (2013.01); G06F 3/0412 (2013.01); *Y10T 29/49117* (2015.01)

(58) Field of Classification Search
CPC ..... G06F 3/0412; G06F 3/044; G02F 1/13338
(Continued)

(56) References Cited

U.S. PATENT DOCUMENTS 5,777,596 A 7/1998 Herbert
2002/0089493 A1 7/2002 Hong
(Continued)

FOREIGN PATENT DOCUMENTS

CN 1361471 A 7/2002
CN 1875312 A 12/2006
(Continued)

OTHER PUBLICATIONS

USPTO RR dated May 24, 2012 in connection with U.S. Appl. No. 12/546,843.
(Continued)

*Primary Examiner* — Chanh Nguyen
*Assistant Examiner* — Navin Lingaraju
(74) *Attorney, Agent, or Firm* — Ladas & Parry LLP

(57) ABSTRACT

The present invention provides an array substrate, a liquid crystal display device comprising the same, and a method for forming the same. The array substrate comprises a gate line, a data line, a signal line and a pixel electrode formed thereon. The gate line intersects the data line to define a plurality of pixel regions in which the pixel electrodes are formed. Each of the pixel electrodes overlaps the signal line
(Continued)

to form a first sensing capacitor and overlaps the gate line to form a second sensing capacitor.

7 Claims, 4 Drawing Sheets

(58) Field of Classification Search
USPC .......................................................... 349/12
See application file for complete search history.

(56) References Cited

U.S. PATENT DOCUMENTS

| | | | |
|---|---|---|---|
| 2002/0190964 A1* | 12/2002 | Van Berkel | G06F 3/041 345/173 |
| 2004/0150629 A1* | 8/2004 | Lee | G06F 3/041 345/173 |
| 2004/0227743 A1 | 11/2004 | Brown | |
| 2005/0094038 A1* | 5/2005 | Choi | G06F 3/0412 349/12 |
| 2005/0162410 A1 | 7/2005 | Johnson et al. | |
| 2006/0012575 A1* | 1/2006 | Knapp | G02F 1/13338 345/173 |
| 2006/0176266 A1 | 8/2006 | Pak et al. | |
| 2006/0176285 A1* | 8/2006 | Lee | G02F 1/13338 345/173 |
| 2007/0117415 A1 | 5/2007 | Shikina | |
| 2007/0176905 A1* | 8/2007 | Shih | G02F 1/13338 345/173 |
| 2007/0182719 A1 | 8/2007 | Lee et al. | |
| 2008/0018581 A1* | 1/2008 | Park | G06F 3/0412 345/98 |
| 2008/0067528 A1* | 3/2008 | Choi | G02F 1/13338 257/89 |
| 2008/0117181 A1 | 5/2008 | Park et al. | |
| 2008/0129898 A1 | 6/2008 | Moon | |
| 2008/0158199 A1 | 7/2008 | Lee et al. | |
| 2008/0174706 A1* | 7/2008 | Kwon | G02F 1/136286 349/12 |
| 2009/0002336 A1 | 1/2009 | Choi et al. | |
| 2009/0058831 A1* | 3/2009 | Chen | G06F 3/044 345/174 |
| 2009/0115750 A1* | 5/2009 | Chen | G06F 3/044 345/204 |
| 2010/0045635 A1 | 2/2010 | Soo | |
| 2011/0102360 A1 | 5/2011 | Chen et al. | |

FOREIGN PATENT DOCUMENTS

| | | |
|---|---|---|
| CN | 101256293 A | 9/2008 |
| JP | 2000-066837 A | 3/2000 |
| WO | 2005/043229 A1 | 5/2005 |

OTHER PUBLICATIONS

USPTO NFOA dated Jul. 31, 2012 in connection with U.S. Appl. No. 12/546,843.

USPTO FOA dated Mar. 14, 2013 in connection with U.S. Appl. No. 12/546,843.

USPTO NFOA dated Aug. 29, 2013 in connection with U.S. Appl. No. 12/546,843.

USPTO NOA mailed Jan. 28, 2014 in connection with U.S. Appl. No. 12/546,843.

* cited by examiner

INTEGRATED LCD TOUCH SCREEN TO DETERMINE A TOUCH POSITION BASED ON AN INDUCED VOLTAGE SUPERIMPOSED ON BOTH THE SCAN SIGNAL OF THE GATE LINE AND A TIMING PULSE OF THE SIGNAL LINE

BACKGROUND OF THE INVENTION

Embodiments of the present invention relate to an array substrate, a liquid crystal display (LCD) device comprising the same, and a method for manufacturing the same.

In the market of flat panel displays, liquid crystal display (LCD) devices have obtained a relatively dominant position because of the characteristics such as smaller volume, lighter weight, lower power consumption, lower radiation, and etc. Generally, a LCD device comprises a backlight for emitting light and a liquid crystal panel comprising a thin film transistor (TFT) array substrate and an opposing color filter substrate with a liquid crystal (LC) layer interposed therebetween. Gate lines for transmitting scan signals, data lines for transmitting data signals, and pixel electrodes for respective pixels are formed on the array substrate. The LCD device can display a desired image by applying an electric field to the LC layer and controlling the intensity of the electric field, thereby adjusting the amount of light that is transmitted through the substrates.

To add a touch screen function to a LCD device, an additional touch panel is typically attached onto the front of the liquid crystal panel of the LCD device. The touch panel can read information corresponding to user's input position when touched.

However, the LCD device having a touch panel attached thereon may have following disadvantages: (1) overall thickness of the display device is increased by the attached touch panel, and additional processes are required for attaching the touch panel, making the manufacture process complicated, and leading to an increase of cost; (2) the touch panel decreases transmissivity of the light transmitted through the liquid crystal panel and causes light parallax, which makes the reproduced image excessively floating and deteriorates the image quality; and (3) lifetime of the touch panel can be shorten because the panel is exposed outside and suffers from external influence.

The Chinese patent application 200480032685.2 provided a LCD device having a touch screen function, in which a first switching element, a second switching element and a third switching element are formed in each of the pixel regions defined by gate lines and data lines on the array substrate in a matrix form. The second and third switching elements are designed to detect variation in liquid crystal capacitance caused by touch. The method for manufacturing this conventional LCD device also has been provided. The conventional LCD device requires two additional switching elements in each pixel region, and therefore its structure become complicated and the number of manufacture processes increases. Further, the aperture ratio is decreased.

SUMMARY OF THE INVENTION

As aspect of the invention provides a liquid crystal display device having a touch screen function comprising an array substrate having a gate line, a data line, a signal line and a pixel electrode formed thereon. The gate line intersects the data line to define a pixel region in which the pixel electrode is formed. The signal line is parallel with the data line, the pixel electrode overlaps the signal line to form a first sensing capacitor for sensing variation of a pixel electrode voltage applied on the pixel electrode and causing voltage variation on the signal line, and the pixel electrode also overlaps the gate line to form a second sensing capacitor for sensing variation of the pixel electrode voltage applied on the pixel electrode and causing voltage variation on the gate line; and the gate line and the signal line are connected to a touch processing section that serves to detect the voltage variation on the gate line and the voltage variation on the signal line and determine the touch position based on the voltage variations.

Another aspect of the invention provides an array substrate for a liquid crystal display device, comprising a gate line, a data line, a signal line and a pixel electrode formed thereon. The gate line intersects the data line to define a pixel region in which the pixel electrode is formed. The signal line is parallel with the data line, and the pixel electrode overlaps the signal line to form a first sensing capacitor and overlaps one gate line to form a second sensing capacitor.

Further another aspect of the invention provides a method for manufacturing an array substrate, comprising: forming a gate line and a data line on a base substrate, the gate line intersecting the data line to define a pixel region; forming a signal line parallel with the data line; forming a pixel electrode in the pixel region. The pixel electrode overlaps one signal line to form a first sensing capacitor and overlaps one gate line to form a second sensing capacitor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

The invention will be described more fully hereinafter with reference to the accompanying drawings, in which the embodiments of the invention are illustrated.

Figure 1:
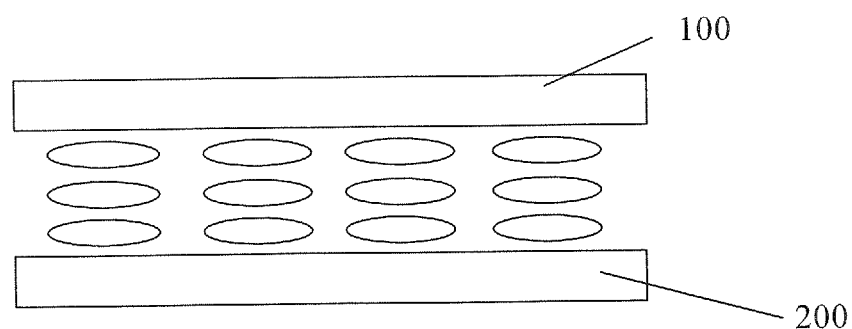
FIG. 1 is a schematic view showing alignment of liquid crystal molecules when a liquid crystal panel is not touched.
Figure 2:
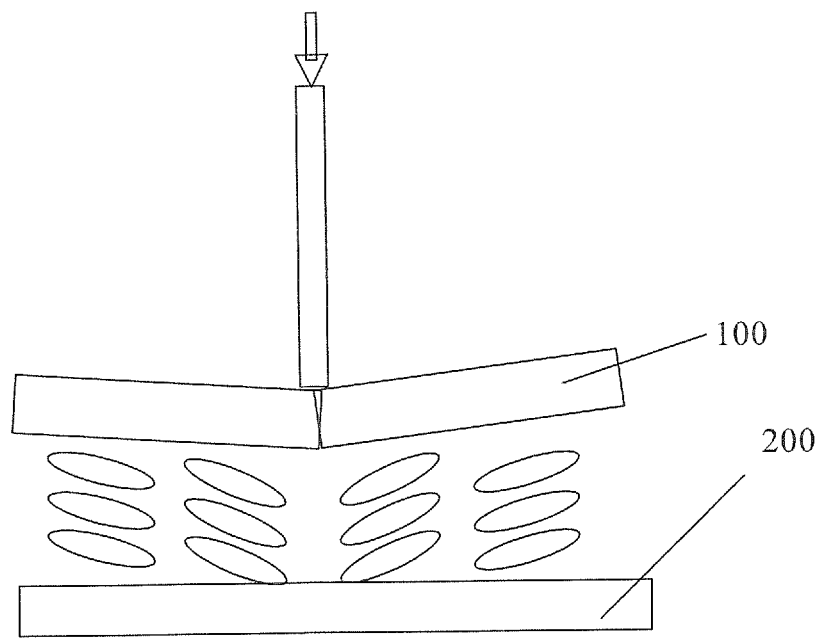
FIG. 2 is a schematic view showing alignment of liquid crystal molecules when a liquid crystal panel is touched.

FIG. 1 is a schematic view showing alignment of liquid crystal molecules when a liquid crystal panel is not touched, and FIG. 2 is a schematic view showing alignment of liquid crystal molecules when a liquid crystal panel is touched.

As shown in FIGS. 1 and 2, liquid crystal materials are filled between an array substrate 200 and a color filter substrate 100, which are provided opposite to each other to form a liquid crystal panel. When the liquid crystal panel is touched, for example, by a finger of a user or a pen, the cell gap between the array substrate 200 and the color filter substrate 100 is changed, and thus the alignment of liquid crystal molecules filled within the panel is changed. Variation of the LC alignment results in variation of LC dielectric constant because liquid crystal molecules have an anisotropic dielectric constant in that a vertical dielectric constant is different than a horizontal dielectric constant. A LC capacitance between a pixel electrode on the array substrate 200 and a common electrode on the color filter substrate 100 can be expressed as an equation: $Clc=aA/d$, where Clc represents the LC capacitance, a is a dielectric constant of the LC material, A is the sectional area of a pixel, and d is the cell gap.

When the LC panel is touched, the LC capacitance Clc is changed due to variation of the dielectric constant and the cell gap. According to principle of charge conservation, that is, $Q=C*V$, variation of the LC capacitance then leads to variation of voltage of the pixel electrode, which also constitutes a kind of electric signal. Embodiments of the present invention enable the touch screen function by reading the change of the LC capacitance in the form of electric signals, collecting and analyzing the change of the electric signals.

Figure 3:
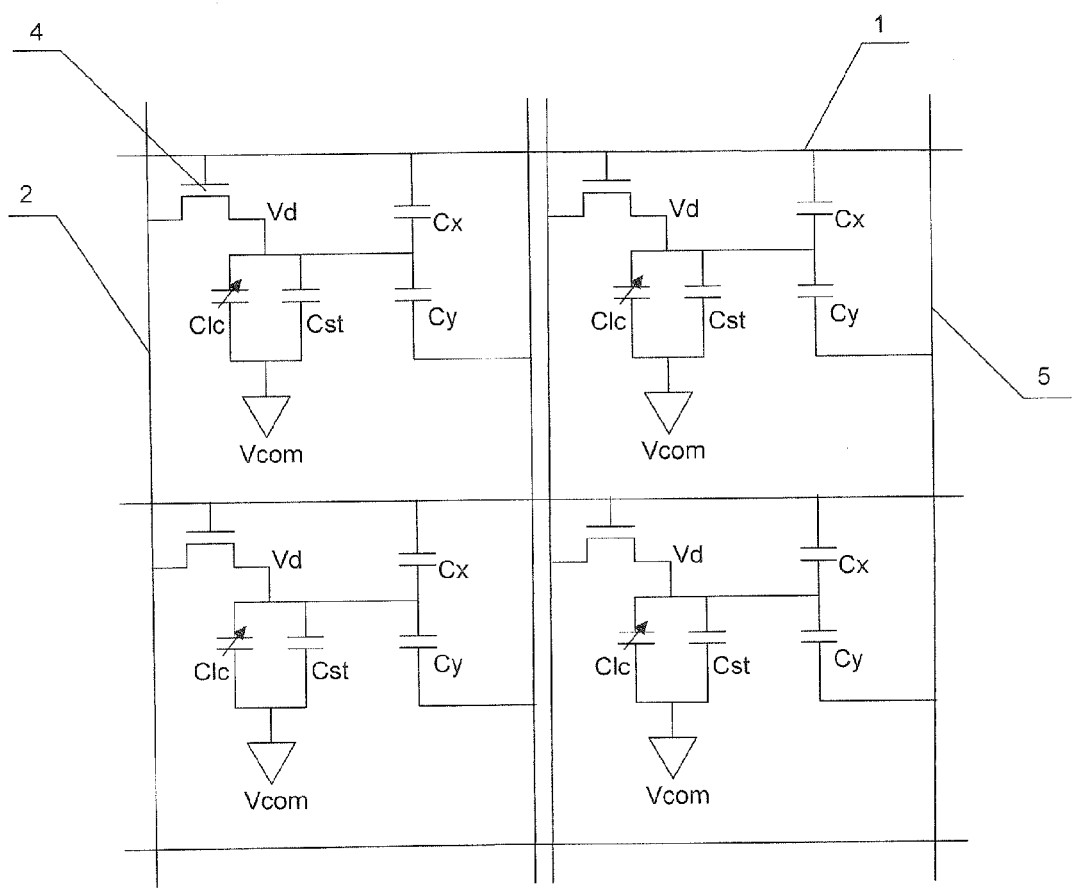
FIG. 3 is an equivalent circuit diagram of an array substrate of a LCD device having a touch screen function according to the present invention.

FIG. 3 is an equivalent circuit diagram of an array substrate of a LCD device having a touch screen function according to an embodiment of the present invention.

As shown FIG. 3, the array substrate comprises gate lines 1, data lines 2, signal lines 5, thin film transistors (TFTs) 4, and pixel electrodes 3. The gate lines 1 intersect the data lines 2 so as to define a plurality of pixel regions in a matrix form. The TFTs 4 are formed as switching elements near the intersections between the gate lines 1 and the data lines 2 in respective pixel regions. The pixel electrodes 3 are also formed in respective pixel regions. The signal lines 5, which are parallel with the data lines 2, are connected to, for example, a narrow timing pulse generator. The gate lines 1 transmit scan signals, and the data lines 2 transmit data signals. LC materials are filled between the pixel electrode 3 on the array substrate 200 and the common electrode on the color filter substrate 100. The pixel electrode and the common electrode form a LC capacitor Clc with voltage of the pixel electrode being denoted by Vd and voltage of the common electrode (the common voltage) being denoted by Vcom. The array substrate 200 may further comprise a storage electrode in each pixel region, which forms a storage capacitor Cst with the pixel electrode for maintaining the voltage applied to the LC capacitor.

As shown in FIG. 3, a first sensing capacitor Cy and a second sensing capacitor Cx are formed and configured to detect change of the LC capacitance Clc caused by change of the cell gap. In each pixel region, the pixel electrode partially overlaps with the corresponding signal line 5 so as to form the first sensing capacitor Cy, which serves to sense the change of pixel electrode voltage Vd and causes voltage change on the signal line 5. In each pixel region, the pixel electrode also partially overlaps with the corresponding gate line 1 so as to form the second sensing capacitor Cx, which serves to sense the change of pixel electrode voltage Vd and causes voltage change on the gate line 1.

Further, the gate lines 1 and the signal lines 5 are connected to a touch processing section (not shown) of the liquid crystal panel. The touch processing section can detect voltage changes on the signal lines 5 and the gate lines 1, amplify the electric signals transmitted on the gate lines 1 and the signal lines 5, and compare the amplified electric signals with the respective reference voltages (REFS) so as to determine whether or not the cell gap is changed at a certain position of the LC panel by touch and, if so, obtain the touch position.

Figure 4:
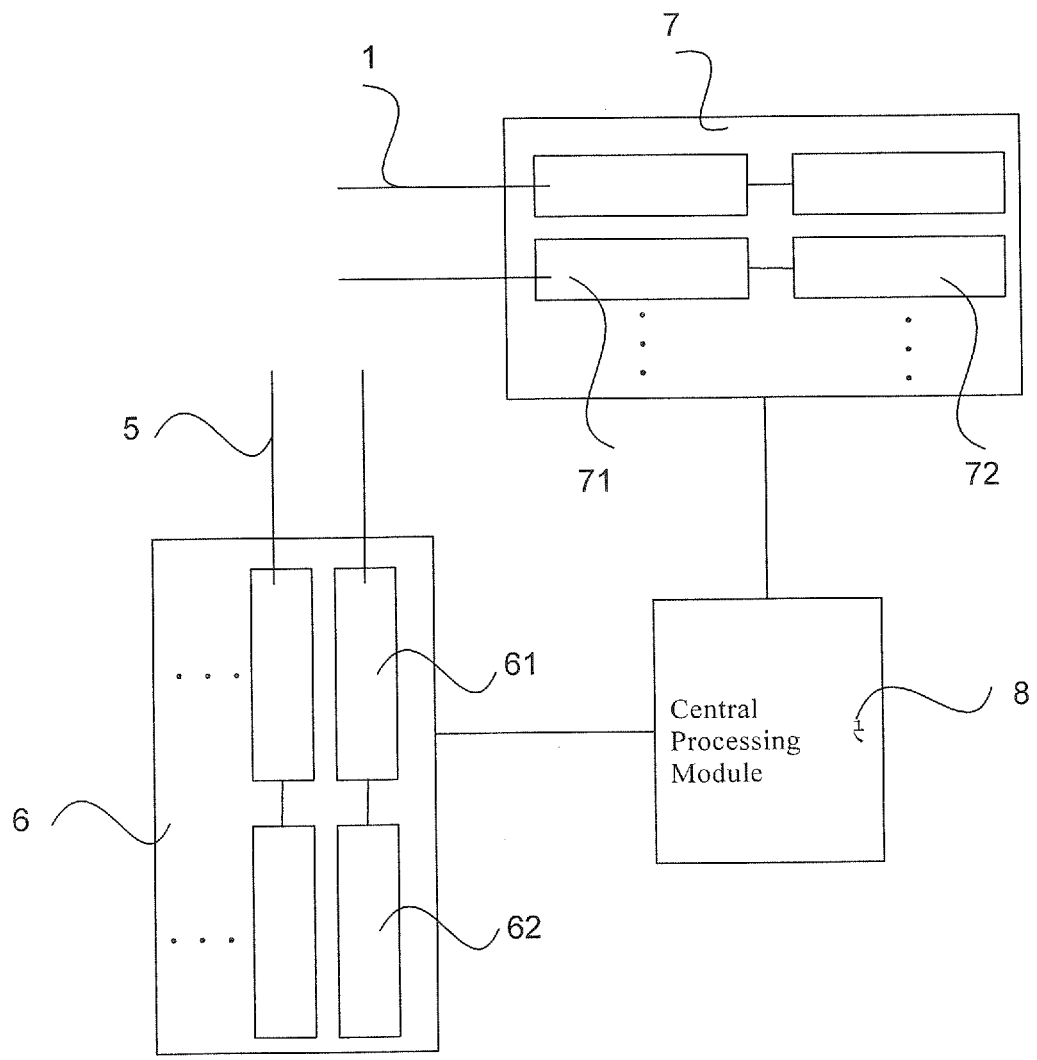
FIG. 4 is a block diagram of a touch processing section of the present invention.

FIG. 4 shows a touch processing section in accordance with an embodiment of the present invention. As shown in FIG. 4, the touch processing section may comprises a first touch detecting module 6 connected to the signal lines 5 to detect which signal line is touched, a second touch detecting module 7 connected to the gate lines 1 to detect which gate line is touched, and a central processing module 8 connected to the first and second touch detecting modules 6 and 7 to determine the touch position based on the detected gate line and the detected data line.

Further, the first touch detecting module 6 may comprise a plurality of first signal amplifiers 61 and a plurality of first comparators 62. Each of the first signal amplifiers 61 may be connected to one of the signal lines 5 to amplify the voltage signal of the signal line 5. The first comparator 62 may be connected to the first signal amplifier 61 to compare the amplified voltage signal of the signal line with a reference voltage of the signal line 5 and determine whether the signal line 5 is touched or not. The second touch detecting module 7 may comprise a plurality of second signal amplifiers 71 and a plurality of second comparators 72. Each of the second signal amplifiers 71 may be connected to one of the gate lines 1 to amplify the voltage signal of the gate line 1. The second comparator 72 may be connected to the second signal amplifier 71 to compare the amplified voltage signal of the gate line 1 with a reference voltage of the gate line 1 and determine whether the gate line 1 is touched or not.

The operation of the LCD device having the touch screen function according to the embodiment of the present invention is described in detail hereinafter with reference to FIGS. 3 and 4. As shown, the gate lines 1 transmit a scan pulse signals generated by a gate driver and sequentially turn on each row of thin film transistors. When the gate line 1 turns on a row of thin film transistors 4, the data lines 2 apply electric signals (data signals) to pixel electrodes on the row, charging the pixel electrodes on the row simultaneously, while the storage capacitors (if there are) can storage an amount of electric charge. The signal lines 5 may be connected to a pulse generator supplying a narrow timing pulse signal. The narrow timing pulse signal mentioned herein is a scan signal with a certain period that is predetermined according to the applied scan signals of the gate lines 1. When the gate line 1 turns on, the corresponding signal line 5 is applied with a pulse signal synchronously.

When the LC panel is touched, change of the LC capacitance Clc results in change of the pixel electrode voltage Vd. If both the gate line 1 and the data line 2 for one pixel region turn on, change of the pixel electrode voltage Vd can be reflected on the first and second sensing capacitor Cy and Cx respectively formed on the gate line 1 and the signal line 5, making the signals transmitted on the gate line 1 and the signal line 5 changed. Then, the gate line 1 and the signal line 5 collect the changed electric signals and transmit them to the touch processing section connected thereto where the changed electric signals are processed and analyzed to obtain touch position information.

Specifically, change of the pixel electrode voltage Vd may be reflected on the first sensing capacitor Cy formed on the signal line 5, having a small change of voltage generated on the signal line 5. The small change of voltage is superimposed on the timing pulse signal transmitted on the signal line 5 from the narrow timing pulse generator, resulting in a voltage signal on the signal line 5. The voltage signal is amplified by the first signal amplifier 61 of the first touch detecting module 6 and then is transmitted to the first comparator 62 where the voltage signal is compared with a reference voltage REF of the signal line 5. If the voltage signal differs from the reference voltage REF, it shows that touch action has occurred. Thus, the signal line that is touched can be detected.

In a similar way, change of the pixel electrode voltage Vd caused by touch can be reflected on the second sensing capacitor Cx formed on the gate line 1, making a small change of voltage generated on the gate line 1. The small change of voltage is superimposed on the gate pulse signal transmitted on the gate line 1 from the gate driver, resulting in a voltage signal of the gate line 1. The voltage signal is amplified by the second signal amplifier 71 of the second touch detecting module 7 and then is transmitted to the second comparator 72 where the voltage signal is compared with a reference voltage REF of the gate line. If the voltage signal of the gate line differs from the reference voltage REF of the gate line, it shows that touch action has occurred. Thus, the gate line that is touched can be detected.

The central processing module 8 can determine horizontal ordinate and vertical ordinate of the touch position on the panel based on the detected gate line and the detected signal line, and thus obtain the touch position accurately. Specifically, the detected signal line that is touched indicates the horizontal ordinate of the touch position, and the detected gate line that is touched indicates the vertical ordinate of the touch position. The touch position is at the intersection of the detected gate line and the detected signal line.

In the present embodiment, the gate lines are droved one after the other with a predetermined period. The gate driver typically generates a sequence of pulse waves with a period of 21.7 μs to sequentially turn on the rows of thin film transistors. For a LC panel with a resolution of 1024*768 and a refresh frequency of 60 Hz, duration of the on-state of a gate line is about 20 μs, which is much shorter than the touching time. So, it can be said that the gate line is always activated during a touch event, and the touch signal can be collected efficiently.

Figure 5:
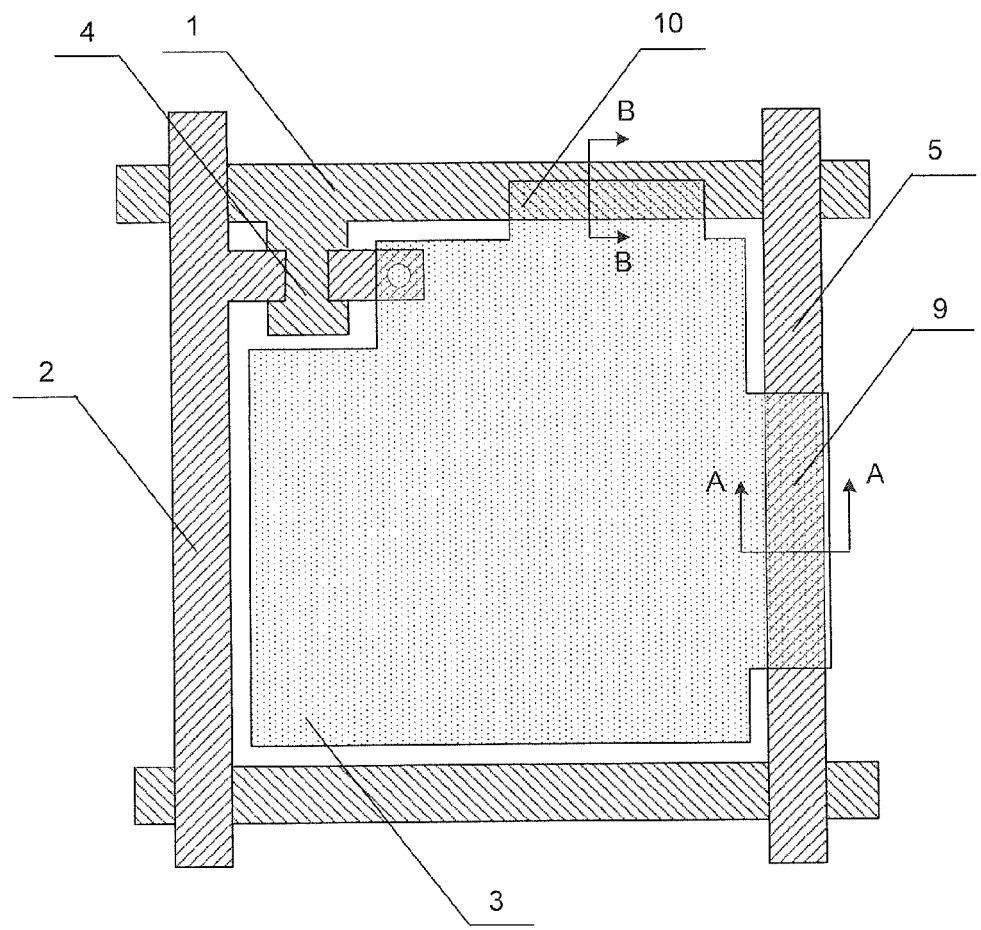
FIG. 5 is a schematic view showing the pixel structure of a TFT-LCD array substrate according to an embodiment of the present invention.

FIG. 5 is a schematic view showing the pixel structure of a TFT-LCD array substrate according to an embodiment of the present invention. As shown, the TFT-LCD array substrate comprises a gate line 1, a data line 2, a signal line 5, a pixel electrode 3 and a thin film transistor 4. The gate line 1 intersects the data line 2 to define a pixel region in which the pixel electrode 3 is formed. The thin film transistor 4 is formed at the intersection of the gate line 1 and data line 2. The signal line 5 is parallel with the data line 2 and intersects the gate line 1. The pixel electrode 3 partially overlaps the signal line 5 to form a first sensing capacitor 9 and partially overlaps the gate line 1 to form a second sensing capacitor 10. In the present embodiment, the thin film transistor 4 may be of a bottom-gate type that comprises a gate electrode formed on the substrate, source and drain electrodes formed above the gate electrode, and a channel region disposed between the source and drain electrodes. The gate electrode is connected to the gate line 1, the source electrode is connected to the data line 2, and the drain electrode is connected through a via hole formed in a passivation layer to the pixel electrode 3. The thin film transistor 4 may also be of another type such as a top-gate type.

Figures 6, 7:
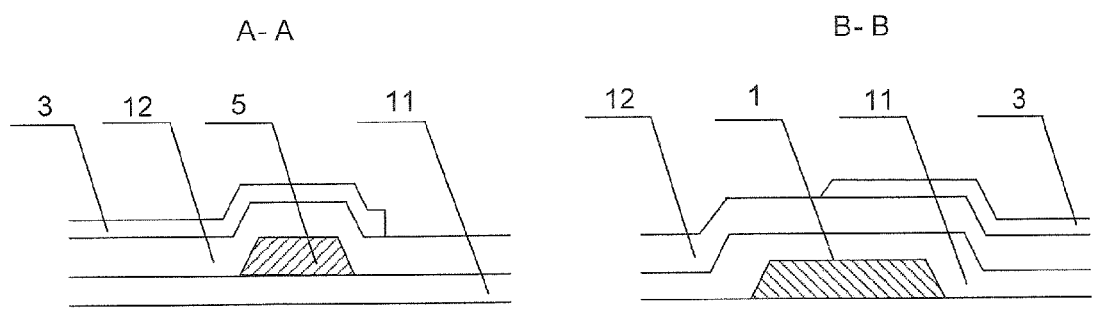
FIG. 6 is a sectional view taken along line A-A in FIG. 5.
FIG. 7 is a sectional view taken along line B-B in FIG. 5.

FIG. 6 is a sectional view taken along line A-A in FIG. 5 and FIG. 7 is a sectional view taken along line B-B in FIG. 5.

In the present embodiment, the data line 2 is disposed at one side of the pixel region defined by the data line 2 and the gate line 1, and the signal line 5 is disposed at another side of the pixel region opposite to the data line 2. The data line 2 and the signal line 5 can be formed in a same layer and by a same patterning process. Referring to FIG. 6, the signal line 5 is formed on the gate insulating layer 11, the passivation layer 12 is formed on the signal line 5, and the pixel electrode 3 is formed on the passivation layer 12. A portion of the pixel electrode 3 extends outward to overlap the signal line 5, forming the first sensing capacitor 9. Referring to FIG. 7, the gate insulating layer 8, the passivation 12 and the pixel electrode 3 are stacked in this order on the gate line 1. A portion of the pixel electrode 3 extends outward to overlap the gate line 1, forming the second sensing capacitor 10.

The array substrate and the LCD device comprising the array substrate according to embodiments of the present invention can achieve a touch screen function by employing the signal line, the first sensing capacitor and the second sensing capacitor without a touch panel being disposed on the front of the array substrate. As compared with the conventional liquid crystal panel that attaches the touch panel on the front of the array substrate, the embodiments of the present invention simplify the manufacture process, reduce the cost and improve the display quality. Also, the embodiments of the present invention avoid the problem in the conventional one that lifetime of the touch panel can be negatively impacted due to its exposure to outside. Further, as compared with the conventional one that has two additional switching elements formed in each pixel region, the array substrate of the embodiments of the present invention has a simpler structure, can be manufactured more easily, and maintain high aperture ratio.

A method for forming the TFT-LCD array substrate according to an embodiment of the present invention comprises the steps of: forming a gate line and a data line on a base substrate, the gate line intersecting the data line to define a pixel region; forming a signal line parallel with the data line; and forming a pixel electrode in the pixel region. The pixel electrode overlaps one signal line to form a first sensing capacitor and overlaps one gate line to form a second sensing capacitor.

The method for manufacturing the TFT-LCD array substrate according to the embodiment of the present invention will be described in detail with reference to the following specific examples. Hereinafter, a patterning process may comprise coating photoresist layer, exposing and developing the photoresist layer, etching with the resulting photoresist pattern as a mask, removing the photoresist pattern, and etc. Exposing process of the photoresist layer may be performed using a conventional mask, a gray mask, a half tone mask or the like.

A first example of the method for forming the array substrate according to the embodiment of the present invention, which uses five patterning processes, comprises the following steps:

step 11 of depositing a gate metal layer on a base substrate, and patterning the gate metal layer to form a gate line and a gate electrode pattern on the base substrate;

step 12 of depositing a gate insulating layer, a semiconductor layer and a doped semiconductor layer (i.e., ohmic contact layer) in this order on the base substrate after step 11, and patterning the semiconductor layer and the doped semiconductor layer to form an active layer pattern over the gate electrode, wherein the gate insulating layer may be formed of silicon nitride or alumina;

step 13 of depositing a source/drain metal layer on the base substrate after step 12, and patterning the source/drain metal layer to form a data line, a source electrode, a drain electrode, a channel region of the thin film transistor and a signal line parallel with the data line, wherein the gate line, the data line, and the source/drain electrode of the thin film transistor may be formed of a single layer made of one of Al, Cr, W, Ta, Ti, Mo and AlNi or a multilayer of any combination of these materials;

step 14 of depositing a passivation layer on the base substrate after step 13 and patterning the passivation layer to form a via hole exposing at least a portion of the drain electrode; and step 15 of depositing a transparent conductive layer on the base substrate after step 14 and patterning the transparent conductive layer to form a pixel electrode connected to the drain electrode through the via hole in the passivation layer, wherein the pixel electrode partially overlaps the signal line to form a first sensing capacitor and partially overlaps the gate line to form a second sensing capacitor.

The pixel electrode may be formed of indium tin oxide (ITO), indium zinc oxide (IZO) or aluminum zinc oxide (AZO).

A second example of the method for forming the array substrate according to an embodiment of the present invention, which uses four patterning processes, comprises the following steps:

step 21 of depositing a gate metal layer on a base substrate and patterning the gate metal layer to form a gate line and a gate electrode pattern on the base substrate;

step 22 of depositing a gate insulating layer, a semiconductor layer, a doped semiconductor layer (i.e., ohmic contact layer) and a source/drain metal layer in this order on the base substrate after step 21, and performing a patterning process with a gray or half tone mask to form a data line, a source electrode, a drain electrode, a channel region and a signal line parallel with the data line, wherein the gate insulating layer may be formed of silicon nitride or alumina, and the gate line, the data line, and the source/drain electrode of the thin film transistor may be formed of a single layer made of one of Al, Cr, W, Ta, Ti, Mo and AlNi or a multilayer of any combination of these materials;

step 23 of depositing a passivation on the base substrate after step 22 and patterning the passivation to form a via hole exposing at least a portion of the drain electrode;

step 24 of depositing a transparent conductive layer on the base substrate after step 23 and patterning the transparent conductive layer to form a pixel electrode connected to the drain electrode through the via hole in the passivation layer, wherein the pixel electrode partially overlaps the signal line to form a first sensing capacitor and partially overlaps the gate line to form a second sensing capacitor.

The pixel electrode may be formed of indium tin oxide (ITO), indium zinc oxide (IZO) or aluminum zinc oxide (AZO).

The method for forming the array substrate according to the present invention is not limited to above examples and may also be performed with other processes known in the relevant art.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. An array substrate for a liquid crystal display device, comprising a gate line, a data line, a thin film transistor (TFT), a signal line and a pixel electrode formed thereon, the gate line intersecting the data line to define a pixel region in which the pixel electrode is formed, wherein a gate, a source and a drain of the TFT are connected with the gate line, the data line and the pixel electrode respectively;

wherein the signal line is parallel with the data line, the pixel electrode overlaps with the signal line to form a first sensing capacitor and overlaps with one gate line to form a second sensing capacitor;

wherein the change of the pixel electrode voltage is reflected on the first sensing capacitor formed on the signal line to cause a change of voltage on the signal line, the change of voltage on the signal line is superimposed on a pulse signal transmitted on the signal line to obtain a voltage signal on the signal line;

wherein the same change of the pixel electrode voltage is also reflected on the second sensing capacitor formed on the gate line to cause another change of voltage on the gate line, the another change of voltage on the gate line is superimposed on the scan signal transmitted on the gate line to obtain a voltage signal on the gate line; and wherein the voltage signal on the signal line and the voltage signal on the gate line are used to determine a touch position related to the touch operation.

2. The array substrate of claim 1, wherein the data line is disposed at one side of the pixel region, and the signal line is disposed at another side of the pixel region opposite to the data line.

3. The array substrate of claim 1, wherein the signal line and the data line are formed of a same material in a same layer.

4. The array substrate of claim 1, wherein the data line is disposed at one side of the pixel region, and the signal line is disposed at another side of the pixel region opposite to the data line.

5. The array substrate of claim 1, wherein the signal line and the data line are formed of a same material in a same layer.

6. The array substrate of claim 1, wherein the signal line is connected with a narrow timing pulse generator.

7. A method for manufacturing an array substrate, comprising:

forming a gate line and a data line on a base substrate, the gate line intersecting the data line to define a pixel region;

forming a signal line parallel with the data line; and forming a pixel electrode in the pixel region, wherein the pixel electrode overlaps with one signal line to form a first sensing capacitor and overlaps with one gate line to form a second sensing capacitor;

wherein in response to a touch operation, a change of a pixel electrode voltage is produced;

wherein the change of the pixel electrode voltage is reflected on the first sensing capacitor formed on the signal line to cause a change of voltage on the signal line, the change of voltage on the signal line is superimposed on a pulse signal transmitted on the signal line to obtain a voltage signal on the signal line; and wherein the same change of the pixel electrode voltage is also reflected on the second sensing capacitor formed on the gate line to cause another change of voltage on the gate line, the another change of voltage on the gate line is superimposed on the scan signal transmitted on the gate line to obtain a voltage signal on the gate line; and wherein the voltage signal on the signal line and the voltage signal on the gate line are used to determine a touch position related to the touch operation.

\* \* \* \* \*